May 5, 1959 E. B. BATES Re. 24,644

WET HEAT TREATMENT OF MATERIAL OF POOR ELECTRICAL CONDUCTIVITY

Original Filed March 29, 1951 2 Sheets-Sheet 1

Inventor
Emile Bernard Bates
By Albert W. Jacobs
Attorney

WET HEAT TREATMENT OF MATERIAL OF POOR ELECTRICAL CONDUCTIVITY

Original Filed March 29, 1951 2 Sheets-Sheet 2

Inventor
Emile Bernard Bates
By Albert G. Jacobs
Attorney

United States Patent Office

Re. 24,644
Reissued May 5, 1959

24,644

WET HEAT TREATMENT OF MATERIAL OF POOR ELECTRICAL CONDUCTIVITY

Emile Bernard Bates, Leicester, England

Original No. 2,714,549, dated August 2, 1955, Serial No. 218,238, March 29, 1951. Application for reissue July 23, 1957, Serial No. 674,008

Claims priority, application Great Britain April 1, 1950

5 Claims. (Cl. 8—151.2)

Matter enclosed in heavy brackets [ ] appears in the original patent but forms no part of this reissue specification; matter printed in italics indicates the additions made by reissue.

This invention concerns the wet heat treatment of material which is a non-conductor or a poor conductor of electricity, and especially textile fabrics. In the treatment of fabrics for the purpose of washing, bleaching, dyeing, or pre-setting, the usual practice is to immerse the fabric in a comparatively large volume of hot or boiling water. For example in the dyeing of woolen or cotton knitted fabric in a standard type of winch machine, the ratio of the weight of the cloth to that of the liquor is at least 1–20, that is to say 1 lb. of fabric requires 2 gallons of water. It will, therefore, be appreciated that at the end of every dyeing operation large quantities of spent dye liquor at or about boiling point are thrown away with substantial calorific loss.

An object of this invention is the provision of a more economical method, and apparatus, for the wet heat treatment of materials having poor electrical conductivity, primarily but not exclusively textile fabrics, and in particular for the treatment of such fabrics at or about the boiling point of the liquor. The treatment is not only applicable to materials which, like wool and cotton yarn and fabric, are absorbent but also to materials which, like yarns and fabrics made of artificial or synthetic fibres (e.g. nylon, artificial silk) or of natural silk, are not water absorbent but are capable of taking up a certain quantity of water by the latter wetting the surfaces of the fibres and being entrained in the interstices between fibres.

The method provided by this invention consists in wetting [the material through with a conducting liquid so that the material is in] *a running web of the material by passing it through a conducting liquid so that the material is brought to a* condition to form a conductor of electricity, and [passing through the wet material an electric current sufficient to raise the temperature thereof by resistance heating.] *then bringing the running web into direct electrical and physical contact across its whole width with a plurality of electrical conducting members in turn which are arranged alternately to engage opposite faces of the web and which are energized electrically so as to cause to be passed through the wet material during its movement past said conducting member an electric current of sufficient magnitude to raise the temperature of the liquid in the web to boiling point by resistance heating.* In general, the current passed through the wet material will be such that the liquid is brought to boiling point in the material itself. It is found that boiling takes place, in and on the material, in the region or regions between the electrodes but not in the immediate vicinity of the electrodes.

According to an important subsidiary feature of the invention the wet material is traversed in contact with a plurality of spaced electrodes to which current is applied, so that the moving material between the electrodes completes the circuit.

Either direct or alternating current may be employed. If the current is alternating current then there is employed a series of electrodes one more in number than the number of phases. More than one such series may be employed. Specifically, in the case of three-phase current, 4 electrodes are employed (or multiples of 4).

Ordinary tap water will not in general be suitable for use in the process in accordance with this invention, without the addition of an ionisable salt or hydroxide, for its conducting quality is too low. Therefore, an important subsidiary feature of the invention resides in the step of adding to an aqueous liquid, prior to its application to the material, a quantity of an ionisable salt or hydroxide which is adequate to secure the required electrical conductivity (i.e. to secure the optimum degree of ionisation). NaOACl, NaCl, $Na_2SO_4$, $(NH_4)_2CO_3$, or NaOH, are suitable substances for this purpose. In each case the respective quantities, by weight, may be one part of the substance in 1000 of water.

The present invention also includes apparatus for *performing a method as aforesaid for* the wet heat treatment of *a running web of* material having poor electrical conductivity but rendered conducting by being wetted with a conducting liquid, which apparatus is constructed to have the wet material in continuous form passed through it and comprises a *wetting bath, means for conducting the material through said bath, a* plurality of material-engaging electrodes spaced apart in the direction of travel of the material, *and arranged to extend across the whole width of the web and to engage alternately with opposite faces of the web,* and means for traversing the wet material *after leaving said bath with its whole width* in *direct electrical* contact with the electrodes to constitute an electric conductor completing an electric circuit between them, *said electrodes being sufficiently closely spaced that* [whereby] current supplied to the electrodes flows along *and through* the material [and raises] *between adjacent electrodes with a sufficient current density to raise* the temperature of the wetting liquid *by resistance heating to its boiling point.*

The general principles of this invention are of wide application and the following description is given only by way of example.

It is desired to wash and cleanse a knitted fabric, and to make it absorbent without disturbing the loop formation or the disposition of the fibres of the yarn. The normal practice heretofore employed would be to make the fabric into an endless rope and to circulate this rope in a container of boiling soap solution, in the proportion of 20 lbs. of the liquor to 1 lb. of fabric. The effect of this treatment is to break up, to some extent, the face of the fabric and to render it obvious to one versed in the art that the fabric has been subjected to a wet treatment.

By way of contrast, according to the present invention the fabric is passed through a bath of soap solution or any other suitable emulsifying agent (e.g. sulphonated castor oil or a sulphonated fatty alcohol) which has added to it an ionisable salt or hydroxide for example as NaCl, [$NaSO_4$] $Na_2SO_4$, $(NH_4)_2CO_3$ or NaOH, in order to make the solution into a reasonable conductor of electricity. After immersion in this liquor, the fabric is led as a band or web over a series of stainless steel rollers that constitute electrodes and are connected to a 400 volt 3 phase current supply. There is preferably a minimum of four rollers in order to equalize the current consumption of each phase; for example the first and last roller of the four are connected to one phase and the other two phases are respectively connected to the other two rollers.

The rollers are of small diameter, for example 1" in diameter, and are spaced slightly apart, for example, the spacing being 2" between centres. Their length is at least equal to the width of the fabric web, so that the latter makes contact with them for its entire width, and the fabric is led under and over them so as to obtain intimate contact between the wet fabric and their surfaces.

Alternatively or in addition the contact may be produced or assisted by co-operating rollers. The electrode rollers are suitably mounted in bearings and are insulated from the remainder of the apparatus. The fabric is earthed before and after the rollers.

As the wet web of fabric passes over the rollers, it completes the electric circuit between them and the liquor mechanically imprisoned in the mesh of the fabric and imbibed by the fibres themselves is, by resistance heating, brought to the boiling point in situ. Such impurities as are present in the fibres are brought to the surface of the fabric in a froth which forms thereon.

The excess of liquor, which is now at or in the region of the boiling point, can be expressed by passing the fabric, after leaving the rollers, through a mangle and if desired the fabric can subsequently be given a hot wash by the method provided by this invention.

It can be shown that 70 lbs. of knitted cotton fabric can be raised to boiling point and cleansed for the expenditure of 3 kilowatts. At a penny per unit, cost would be 3d. whereas to boil and cleanse the same quantity of fabric by the method heretofore used, would involve the use of 140 gallons of liquor and a cost *of* at least 5/—d. Moreover, the treatment is not deleterious to the feel or appearance of the fabric and is particularly suitable for knitted fabric.

The invention is applicable to the bleaching of the fabric, for if the solution through which the fabric is passed is a solution of NaCl and the current which is applied to the electrodes is either direct current or is an alternating current with a direct current superimposed on it, nascent chlorine is liberated which serves to bleach the fabric.

In the case of woolen fabrics, the result may also be to render the fabric "shrink proof," due to the fact that the nascent chlorine gas will de-scale the wool fibres.

Examples of suitable liquors for the wet heat treatment of textile fabrics are as follows:

EXAMPLE 1

NaOCl, 1 pint in 25 gallons.
$NH_4Cl$, 1 lb.
Suitable oil (such as sulphated castor oil, or soap) 1 pint.
Chlorine is liberated and acts on wool fibres to de-scale them.

EXAMPLE 2

As Example 1 but with the addition of 1 pint of 100 vol. $H_2O_2$, which increases the liberation of chlorine.

In order to assist in carrying the invention into effect reference will now be made to the accompanying drawings in which—

Figures 1, 2, and 3 are respectively a side elevation, a sectional elevation, and a plan (with part of the apparatus omitted) of a preferred construction of fabric-treating machine according to the invention.

Figure 4:
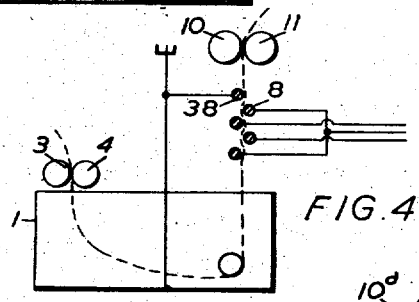
Figure 4 is a diagram showing electrical connections in this machine.

In one construction, the apparatus according to this invention consists of a bath for the electrolyte (and the emulsifying agent if one is employed) containing at least one submerged roller 2 under which the fabric F passes from a pair of feed rollers 3, 4. Instead of a single submerged roller, there may be a pair of submerged pressure rollers between which the fabric passes and which ensure that it is thoroughly soaked. From the submerged roller or rollers, the fabric F travels upwards to a heating station equipped with four electrode rollers or bars 5, 6, 7, 8 (which extend horizontally for the full width of the fabric), and thence between the rollers 10, 11 of a mangle. Electrode rollers 5 and 8 are connected to one phase of a three-phase supply, and rollers 6 and 7 to the other two phases respectively as shown in Figure 4; the wet fabric passes between the electrodes as shown, so as to complete the electric circuit between them.

The electrodes and the draw-up rollers 10, 11, are enclosed within a cabinet 12, having a slidable glass panel 13 at the front, through which the action at the electrodes may be seen, and having hinged doors 14, 15, at the back. From the top of the cabinet 12 the fabric passes up over a roller 16 and thence to a roller 17 from which it passes down through a swinging spout or layer 18, which is oscillated so as to lay the fabric in a zig-zag pile.

The roller 11 is driven by driving connections, here shown as incorporating a chain drive 19, from a lay shaft 20 which is itself driven through a reduction unit 21 from variable speed electric motor 22. Feed roller 3 is similarly driven by a drive 23 from lay shaft 20. Roller 16 is driven by a gearing 24, 25, Figure 1, and a driving connection 26, from the mangle roller 10. The gear 25 has a crank 27 which oscillates the layer 18 through a connecting rod 28.

The pressure between feed rollers 3, 4, is adjustable by conventional mechanism indicated at 29 which incorporates pressure springs 30. The pressure between the rollers 10 and 11 is also adjustable. For this purpose the roller 10 is mounted in slidable bearing blocks 31, 31'. These are moved through connections 32, 32' by levers 33, 33' pivoted at 34, 34' respectively and having their ends engaged by a plate 35. The latter is movable through the pressure of a spring 36 adjustable by hand-operated screw mechanism 37.

The tank 1 is preferably earthed as shown diagrammatically in Figure 4. In addition the fabric is also preferably engaged, after leaving the last electrode 8, by an earthing roller or bar 38 as shown in Figure 4. Instead of employing such an earthing roller one or both of the rollers 10, 11 may be earthed.

Figure 1:
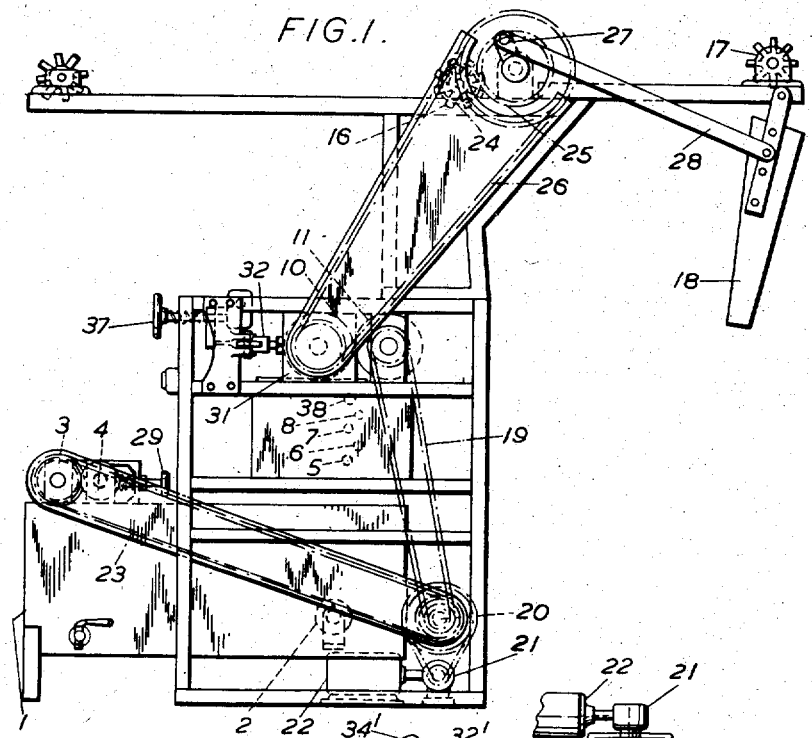
Figure 3:
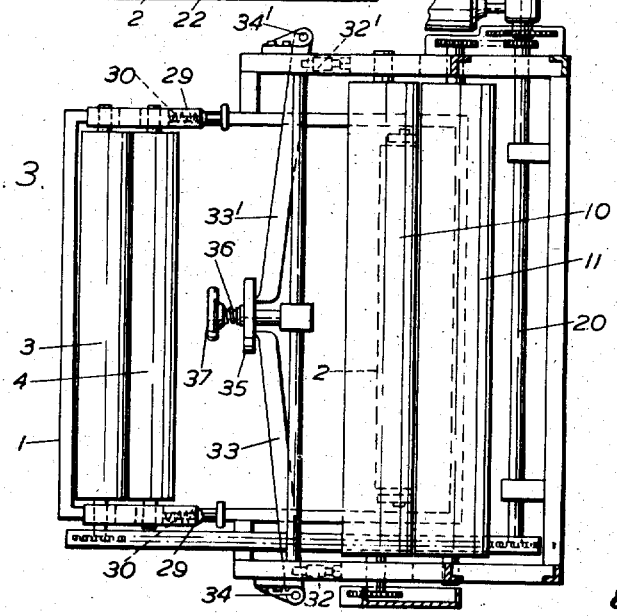
Figure 2:
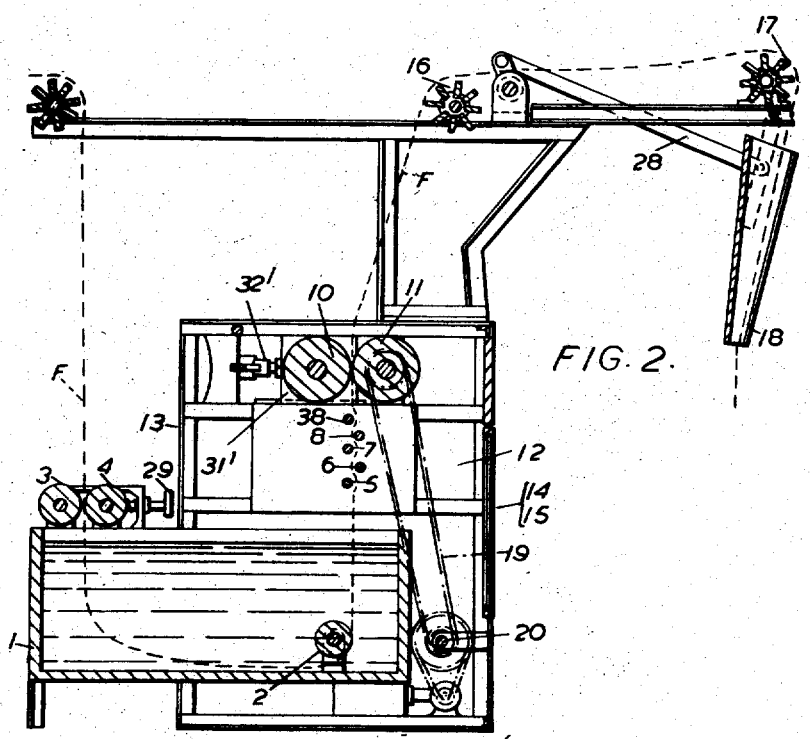
Figure 5:
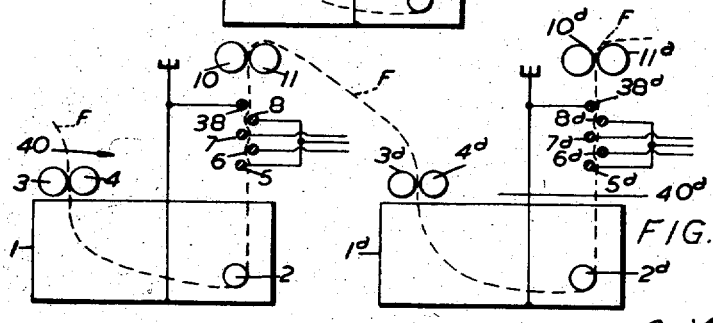
Figure 5 is a diagram illustrating a modified construction.

If desired the apparatus may be duplicated as shown diagrammatically in Figure 5. In this figure the first set of apparatus, which is substantially as already described with reference to Figures 1–3, is indicated generally at 40 and the duplicate apparatus which follows it is indicated generally at 40a. In this duplicate apparatus 40a parts which are similar to those already described with reference to Figures 1–4 and which are incorporated in the first piece of apparatus 40 are distinguished by the addition of the reference letter a to their reference numbers. It will be seen that after leaving the first mangle 10, 11, the fabric F passes down through feed rollers 3a, 4a and thence into the second bath 1a (which may contain a washing electrolyte). In the latter it passes under the submerged roller 2a and up through the second set of electrodes 5a—8a and thence to the second mangle 10a, 11a where surplus liquid is squeezed out.

The quantity of liquor, in and on the fabric, that is boiled may be increased by causing the fabric to travel over a liquor-retaining surface as it passes over the electrodes. For example, it may travel over a flat surface of glass or other non-conducting material which prevents the gravity escape of the liquor from the fabric.

The tank 1 (or 1a, or both) may be provided with an automatic measuring device (of known type) operating on the tipping bucket principle to add ingredients in order to compensate for loss in [conductive] *conductivity* due either to preferential absorption of salts in the fabric or losses due to electrolysis.

I claim:

1. The method of removing undesirable impurities from the fibers of organic textile material in the form of a fabric, rope or strand to render the same more absorbent, which comprises continuously moving [of] the textile material into and through an aqueous cleansing solution to saturate the fibers thereof, continuing the passage of the textile material out of the solution and while moving such material subjecting it while out of the solution to a resistance heating in sufficient amount to raise the entrained solution to boiling in the fibers, continuing such boiling for a period of time sufficient to develop on the surface of the fibers a froth carrying the impurities, and then substantially immediately thereafter removing from the surface of the textile material the impurities carrying froth.

2. The invention according to claim 1, wherein the removal of the froth is effected by squeezing.

3. Apparatus for the continuous wet heat treatment of a textile material having poor electrical conductivity, comprising an open top receptacle adapted to contain a wetting liquid, feeding means for conducting a continuous length of textile material into the receptacle, means for guiding the material from the lower part of the receptacle upwardly, a plurality of electrodes of a length at least equal to the width of the material means supporting the electrodes in a vertical line and in vertically spaced staggered relation transversely of and directly over the receptacle in a position to have the length of material rising from said guiding means pass between the staggered electrodes for the engagement of the electrodes alternately with opposite faces of the material, and means for drawing the material upwardly from the receptacle and between the staggered electrodes, said electrodes being spaced in sufficient closeness to cause the material to assume an undulating form as it is drawn between the electrodes so that current applied to the electrodes flows along and through the material passing therebetween with a current density sufficient to raise the temperature of the wetting liquid by resistance heating to its boiling point, said means for drawing the material upward comprising a pair of mangle rollers disposed directly above the electrodes.

4. The invention according to claim 3, wherein said electrodes are insulated from ground, and an additional electrode spaced above the plurality of electrodes in position for engagement by the material and means grounding the additional electrode.

*5. A method for the wet heat treatment of a running web of textile material having poor electrical conductivity, which method consists in passing the web of material through a conducting liquid so that the material is brought to a condition to form a conductor of electricity, then bringing the running web into direct electrical and physical contact across its whole width with a plurality of electrical conducting members in turn engaging alternately with opposite faces of the web, and simultaneously with the bringing of the web into contact with said electrical conducting members impressing an electric potential between the electrical conducting members of such magnitude as to cause the flow of an electric current through the fabric in amount sufficient to raise the temperature of the liquid in the web to its boiling point.*

References Cited in the file of this patent or the original patent

UNITED STATES PATENTS

| | | |
|---|---|---|
| 1,972,608 | Uhlmann et al. | Sept. 4, 1934 |
| 1,992,778 | Seidel et al. | Feb. 26, 1935 |
| 2,402,609 | Brabander | June 25, 1946 |
| 2,423,945 | Osipow et al. | July 15, 1947 |
| 2,486,490 | McDonald et al. | Nov. 1, 1949 |